US006428591B1

(12) United States Patent
Bouchillon et al.

(10) Patent No.: US 6,428,591 B1
(45) Date of Patent: Aug. 6, 2002

(54) PRESSURIZED CYCLONE INCLUDING AGITATOR ASSEMBLY

(75) Inventors: Charles Wesley Bouchillon, Starkville, MS (US); Andrew Franko, Dayton; John Anthony McBlane, Springfield, both of OH (US)

(73) Assignee: Fluid-Quip, Inc., Springfield, OH (US)

( * ) Notice: Subject to any disclaimer, the term of this patent is extended or adjusted under 35 U.S.C. 154(b) by 0 days.

(21) Appl. No.: 09/653,370

(22) Filed: Sep. 1, 2000

(51) Int. Cl.[7] .......................... B01D 45/12; B01D 50/00
(52) U.S. Cl. ......................... 55/459.1; 55/466
(58) Field of Search ........................ 55/400, 401, 402, 55/403, 438, 466, 459.1, 318; 366/302, 303

(56) References Cited

U.S. PATENT DOCUMENTS

| 756,342 A | 4/1904 | Dulin |
| 815,674 A | 3/1906 | Bent |
| 1,760,617 A | 5/1930 | Whitmore |
| 2,441,631 A | 5/1948 | Hills |
| 2,663,623 A | * 12/1953 | Anderson .................... 366/303 |
| 4,089,473 A | 5/1978 | John |
| 4,129,261 A | 12/1978 | Engels et al. |
| 4,136,831 A | 1/1979 | Cederquist et al. |
| 4,172,710 A | 10/1979 | van der Molen |
| 4,206,879 A | 6/1980 | Geiger |
| 4,235,665 A | 11/1980 | Reinhall et al. |
| 4,253,857 A | 3/1981 | Fisher |
| 4,273,295 A | 6/1981 | Pöllmann |
| 4,555,254 A | 11/1985 | Fisher |
| 4,616,785 A | 10/1986 | Artiano |
| 4,620,673 A | 11/1986 | Canepa et al. |
| 4,725,295 A | 2/1988 | Fisher |
| 4,730,789 A | 3/1988 | Geiger |
| 4,936,513 A | 6/1990 | Smith |
| 5,944,952 A | * 8/1999 | Shackford et al. ............ 162/52 |
| 5,980,639 A | 11/1999 | Trickey et al. |
| 6,019,825 A | 2/2000 | Greene et al. |

FOREIGN PATENT DOCUMENTS

GB 776917 6/1957

OTHER PUBLICATIONS

Lahner, "The Pressurized Cyclone and Swept Orifice Discharger™ at Publishers—Oregon City", *PIMA Magazine*, vol. 65(8) 35–36 (1983).

* cited by examiner

*Primary Examiner*—Robert A. Hopkins
(74) *Attorney, Agent, or Firm*—Wood, Herron & Evans

(57) ABSTRACT

A pressurized cyclone for separating solid material from a fluid flow in which the solid material is entrained in a gaseous fluid maintained in an elevated pressure. The cyclone includes a housing having upper and lower ends and defining a longitudinal axis. An agitator assembly is positioned within the housing proximate the lower end, and includes a plurality of radially extending agitator members supported for rotation about the longitudinal axis. A plurality of radially extending anti-rotation members are removably supported within the side wall, wherein the plurality of anti-rotation members are axially spaced relative to the plurality of agitator members. A motor is operably connected to the agitator members for rotating the agitator members about the longitudinal axis whereby the agitator members move relative to the anti-rotation members for agitating the solid material.

14 Claims, 8 Drawing Sheets

PRESSURIZED CYCLONE INCLUDING AGITATOR ASSEMBLY

BACKGROUND OF THE INVENTION

1. Field of the Invention

The present invention relates generally to the separation of solid particles that are entrained in a gaseous process fluid maintained at an elevated pressure and, more particularly, relates to the separation of wood fibers entrained in process generated steam in order to reduce the amount of volatile organic compound (VOC) emissions generated in the refining of wood fiber for the manufacture of medium density fiberboard (MDF).

2. Description of the Prior Art

It is well known in the art to use a pressurized cyclone in thermo-mechanical pulping (TMP) for the separation of wood fibers from a gaseous process fluid, typically steam. The steam which is separated from the wood fibers is then often recovered for reuse in the pulping process. Examples of such pressurized cyclones are disclosed in U.S. Pat. Nos. 4,555,254 and 4,725,295, both of which are incorporated herein by reference.

In a system for manufacturing medium density fiberboard (MDF), the operating parameters are somewhat different than in a TMP system. Moreover, the system pressure is generally higher and less steam or gaseous process fluid is produced. Accordingly, experience has proven that there is insufficient steam in MDF refining to justify steam recovery for reuse within the process. Additionally, the use of traditional pressurized cyclones within conventional MDF processes has often resulted in the wood fibers congealing, or clumping together, and thereby preventing the exhaust of the separated wood fibers from the cyclone. As such, the wood fibers will often combine to form a single mass thereby preventing proper operation of the cyclone.

Therefore, while the use of pressurized cyclones in traditional MDF processes has typically been avoided, the present applicants have further investigated the use of such pressurized cyclones for the purpose of reducing volatile organic compound (VOC) emissions. Moreover, VOC emissions are traditionally generated in the refining of wood chips, sawdust and wood fibers during the manufacture of MDF. More particularly, VOCs, such as turpene, contained within the process steam are typically released when the wood fiber is dried in a conventional dryer. Applicants have realized that by reducing the amount of steam conveyed to the dryer with the wood fibers, VOC emissions may be reduced. Moreover, VOCs contained within steam separated from the fibers may be oxidized in a boiler to produce carbon dioxide and water vapor.

Additionally, the wood fibers, stripped of the excess conveying steam by the pressurized cyclone, are then accessible for more efficient resin addition. Further, the load applied to the dryer is significantly reduced.

Accordingly, there is a need for a pressurized cyclone which may be effectively used within the MDF process. Moreover, there is a need for such a pressurized cyclone which efficiently separates steam from the entrained wood fibers while preventing the undesired congealing, or clumping, of the wood fibers and the resultant plugging of the pressurized cyclone outlet.

SUMMARY OF THE INVENTION

The present invention provides a cyclone for use in a pressurized materials processing system, such as a medium density fiberboard (MDF) processing system, for separating solid material which is entrained in a gaseous fluid.

Moreover, the present invention relates to a cyclone for receiving a fluid flow in which solid material is entrained in a gaseous fluid maintained at an elevated pressure, the cyclone including a housing having an upper end, a lower end and a substantially cylindrical side wall defining a longitudinal axis. An inlet is formed within the housing proximate the upper end and is tangentially oriented relative to the side wall for inducing the fluid flow to rotate about the longitudinal axis, thereby imparting centrifugal force on the solid material. A gaseous fluid outlet extends upwardly from the upper end of the housing for providing egress of a first, or separated, portion of the gaseous fluid. An entrained solid outlet is formed within the housing and positioned proximate the lower end for providing egress of the solid material entrained within a second, or conveying, portion of the gaseous fluid.

An agitator assembly is positioned within the housing proximate the lower end. The agitator assembly includes a vertically extending, rotatably supported drive shaft coaxially disposed with the longitudinal axis. A plurality of agitator members are supported for rotation with the drive shaft about the longitudinal axis, each of the plurality of agitator members including opposing first and second ends and extending radially outwardly toward the side wall. The first end of each agitator member is supported by a hub fixed to the drive shaft while the second end of each agitator member is positioned proximate the side wall.

A plurality of anti-rotation members are removably supported by the side wall in axially spaced relation to the plurality of agitator members. Each of the plurality of anti-rotation members includes opposing first and second ends and extends radially inwardly through one of a plurality of mounting apertures formed within the side wall of the housing. The first end of each anti-rotation member is supported outside the housing while the second end is positioned proximate the hub.

A motor is operably connected to the drive shaft for rotating the plurality of agitator members about the longitudinal axis, whereby the agitator members move relative to the anti-rotation members for agitating the solid material. The anti-rotation members prevent the solid material from forming a solid plug which moves in unison with the agitator members.

In operation, the gaseous fluid and entrained solid material enters the housing substantially tangential to the side wall, and is therefore forced to rotate or swirl about the longitudinal axis in the form of a vortex. The vortex results in centrifugal force causing the entrained solid particles to move outwardly toward the inner surface of the side wall and separate from the gaseous fluid. The first, or separated, portion of the gaseous fluid exhausts upwardly through the gaseous fluid outlet. The first portion of the gaseous fluid is then preferably sent to a boiler which oxidizes the volatile organic compounds contained therein through combustion. The entrained solid material along with the second, or conveying, portion of the gaseous fluid move downwardly to a lower portion of the housing.

The motor causes rotation of the drive shaft and the plurality of agitator members positioned proximate the lower end of the housing. The meshing interaction between the rotating agitator members and the stationary anti-rotation members prevent the congealing or clumping of the solid particles proximate the entrained solid outlet. As such, the second portion of the gaseous fluid conveys the solid material from the lower end of the housing through the entrained solid outlet to the next processing station, typically a dryer.

Therefore, it is an object of the present invention to provide a pressurized cyclone for reducing the amount of volatile organic compound emissions produced during medium density fiberboard processing.

It is a further object of the present invention to provide a pressurized cyclone for efficiently separating process generated gaseous fluid from entrained solid material.

It is another object of the present invention to provide a pressurized cyclone including an agitator assembly for preventing the plugging of the entrained solid outlet.

It is a further object of the present invention to provide such an agitator assembly having a simple and inexpensive design.

It is still yet another object of the present invention to provide such an agitator assembly which includes removably supported anti-rotation members for facilitating disassembly, cleaning and maintenance.

Other objects and advantages of the invention will be apparent from the following description, the accompanying drawings and the appended claims.

DETAILED DESCRIPTION OF THE PREFERRED EMBODIMENT

Figure 1:
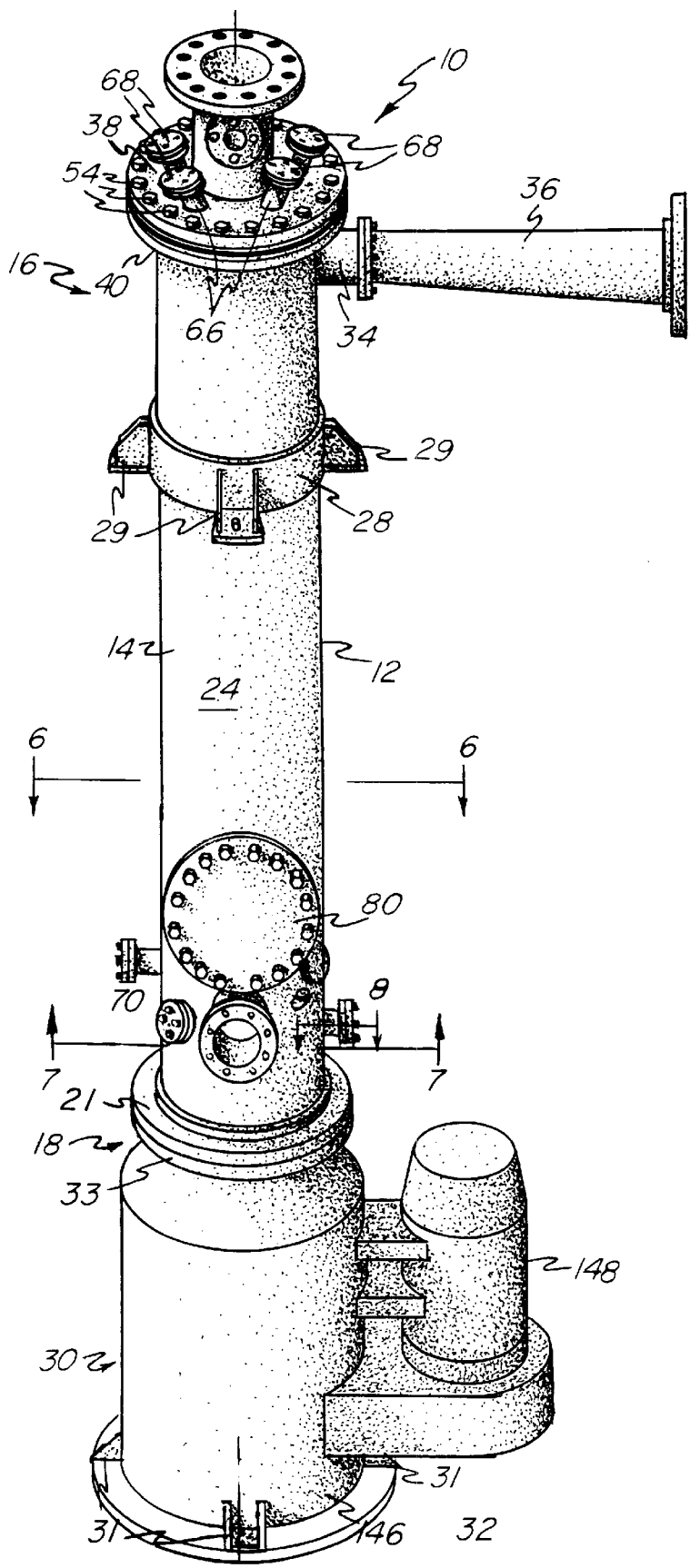
FIG. 1 is a perspective view of the pressurized cyclone of the present invention.

Referring initially to FIGS. 1–4, there is shown a pressurized cyclone 10 of the type which may be utilized in the processing of wood fiber and, more particularly, in the manufacturing of medium density fiberboard (MDF). The cyclone 10 includes a housing 12 having a substantially cylindrical side wall 14 extending between upper and lower ends 16 and 18. The housing 12 defines an interior processing chamber 20 and includes a flange 21 positioned adjacent the lower end 18. The side wall 14 includes arcuate inner and outer surfaces 22 and 24. A longitudinal axis 26 is defined by the side wall 14 and extends in an axial direction between the upper and lower ends 16 and 18.

Referring further to FIG. 1, the cyclone 10 includes an annular ring 28 supported on the outer surface 22 intermediate the upper and lower ends 16 and 18. The annular ring 28 supports a plurality of mounting brackets 29 to facilitate the installation of the cyclone 10 in a processing system. A drive assembly 30 is fixed below the lower end 18 of the housing 12 and includes a plurality of support brackets 31 fixed to a base 32 for supporting and stabilizing the cyclone 10. Additionally, the flange 21 of the housing 12 is sealingly secured to a flange 33 of the drive assembly 30 in a conventional manner.

Figure 2:
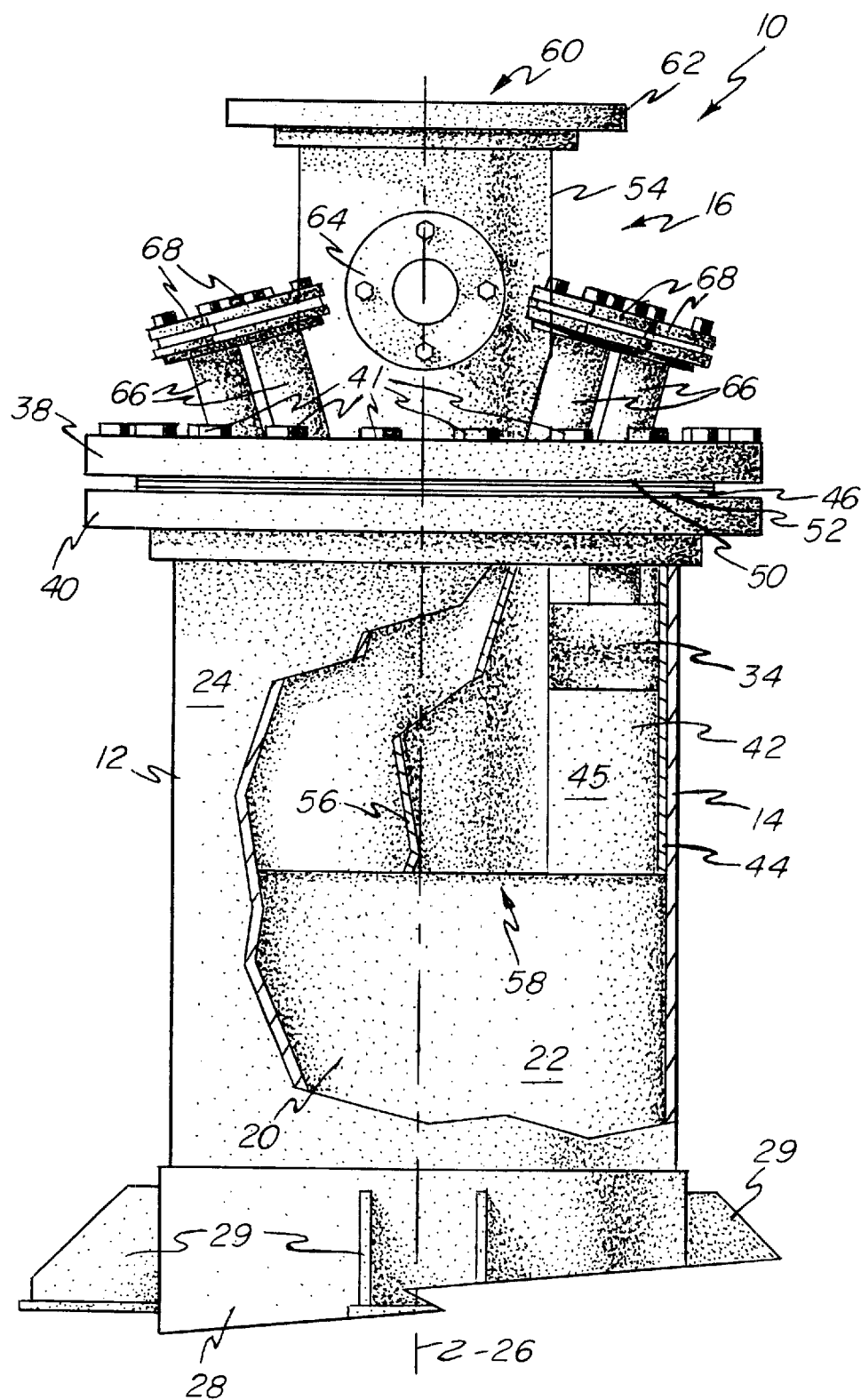
FIG. 2 is a front elevational view, with a partial cut-away, of the upper end of the cyclone of FIG. 1.
Figure 4:
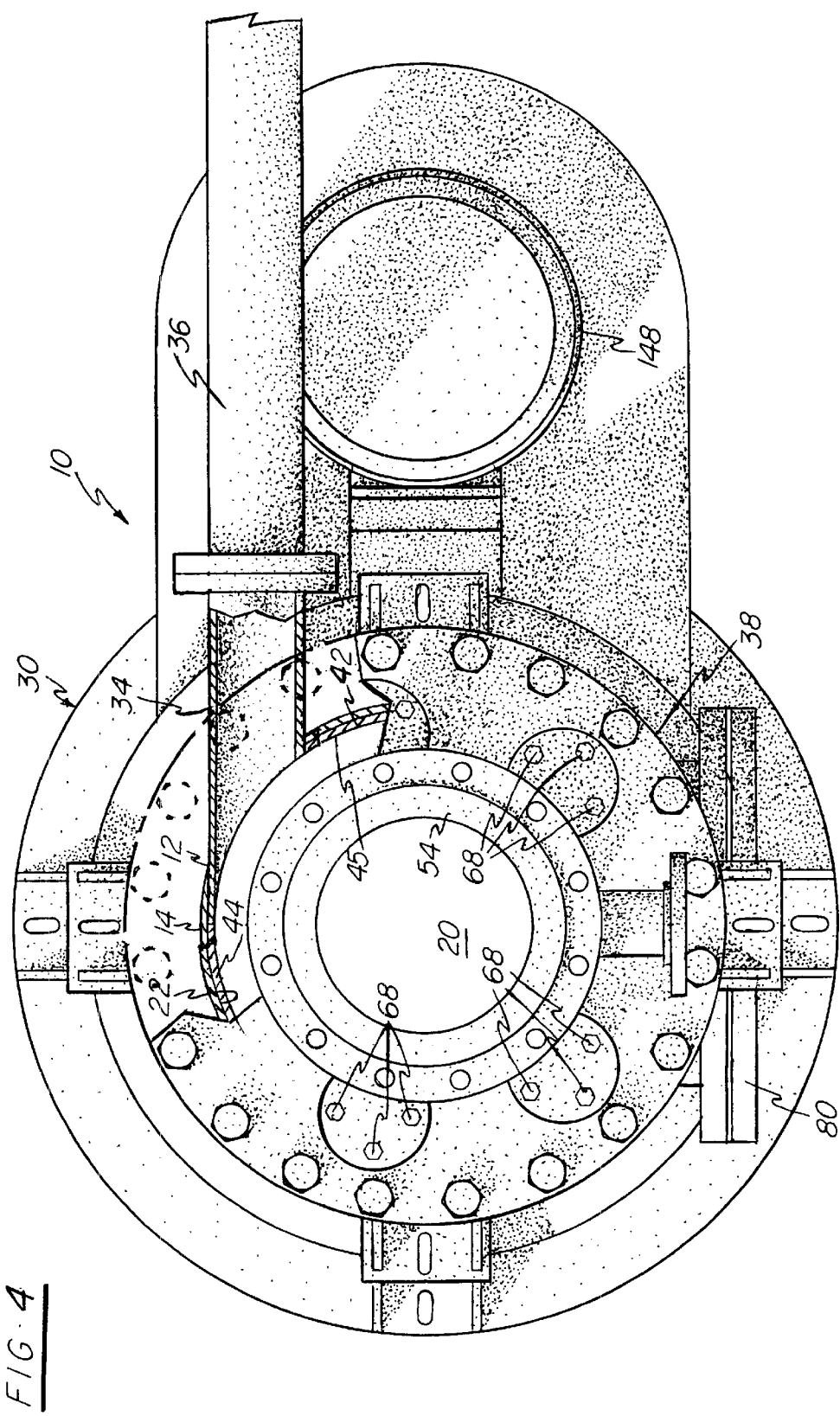
FIG. 4 is a top plan view, with a partial cut-away, of the cyclone of FIG. 1.

Referring now to FIGS. 1, 2 and 4, an inlet 34 is formed within the side wall 14 of the housing 12 for communicating with an inlet pipe 36. Fluid flow in which a solid material is entrained in a gaseous fluid, such as wood fibers entrained within process steam from a conventional refiner (not shown), is provided through the inlet pipe 36 to the interior chamber 20 of the housing 12 through the inlet 34. The inlet 34 is oriented in substantially tangential relation with the side wall 14 for imparting a swirling or rotating motion to the fluid flow about the longitudinal axis 26, thereby forming a vortex of fluid flow (FIG. 4). The vortex applies a centrifugal force to the wood fibers thereby causing them to move outwardly toward the inner surface 22 of the sidewall 14 and separating the fibers from a first portion of the steam.

An end cap 38 is fixed to an annular flange 40 supported by the upper end 16 of the side wall 14 through a plurality of bolts 41. A wear liner 42 is concentrically received within the interior chamber 20 proximate the upper end 16 of the housing 12. More particularly, the wear liner 42 includes a cylindrical side wall 44 having an inner surface 45. The side wall 44 extends downwardly from a mounting flange 46 and is coaxially aligned with the side wall 14 of the housing 12. The mounting flange 46 is secured intermediate the end cap 38 and the annular flange 40 by the plurality of bolts 41. Gaskets 50 and 52 are preferably provided intermediate the end cap 38 and the mounting flange 46, and intermediate the mounting flange 46 and the annular flange 40 to seal against leakage. The wear liner 42 is replaceable and preferably constructed of the same material as the side wall 14, most preferably stainless steel, and prevents degradation of the inner surface 22 of the side wall 14 from the wood fibers.

A gaseous fluid outlet 54 is supported by the end cap 38 and extends in a substantially vertical direction therethrough in coaxial alignment with the longitudinal axis 26. The gaseous fluid outlet 54 includes a cylindrical side wall 56 having a lower end 58 positioned within the chamber of the housing 12 and an upper end 60 supported above the upper end 16 of the housing 12 (FIG. 2). The upper end 60 of the gaseous fluid outlet 54 supports a first mounting flange 62 to facilitate the mounting of external piping (not shown) in a conventional manner, preferably for providing fluid communication with a fluidized bed boiler (not shown). The fluidized bed boiler may be utilized to efficiently oxidize volatile organic compounds (VOCs) contained within the first portion of steam passing through the gaseous fluid outlet 54. In the preferred embodiment, the bed boiler oxidizes the VOCs, through combustion at approximately 1400° F., into carbon dioxide and water vapor. Proximate the upper end 60 of the outlet 54, a second mounting flange 64 is provided within the cylindrical side wall 56 for the mounting of a pressure relief valve (not shown) of the type known in the art.

A plurality of steam injection tubes 66 are supported by the end cap 38 and extend substantially vertically from above the mounting flange 40 into the chamber 20 defined by the housing 12. Removable covers 68 are provided to seal the upper ends of the steam injection tubes 66 to prevent the release of steam or wood fibers therethrough. The steam injection tubes 66 are provided for the selected application of steam therethrough for cleaning the processing chamber 20.

Figure 3:
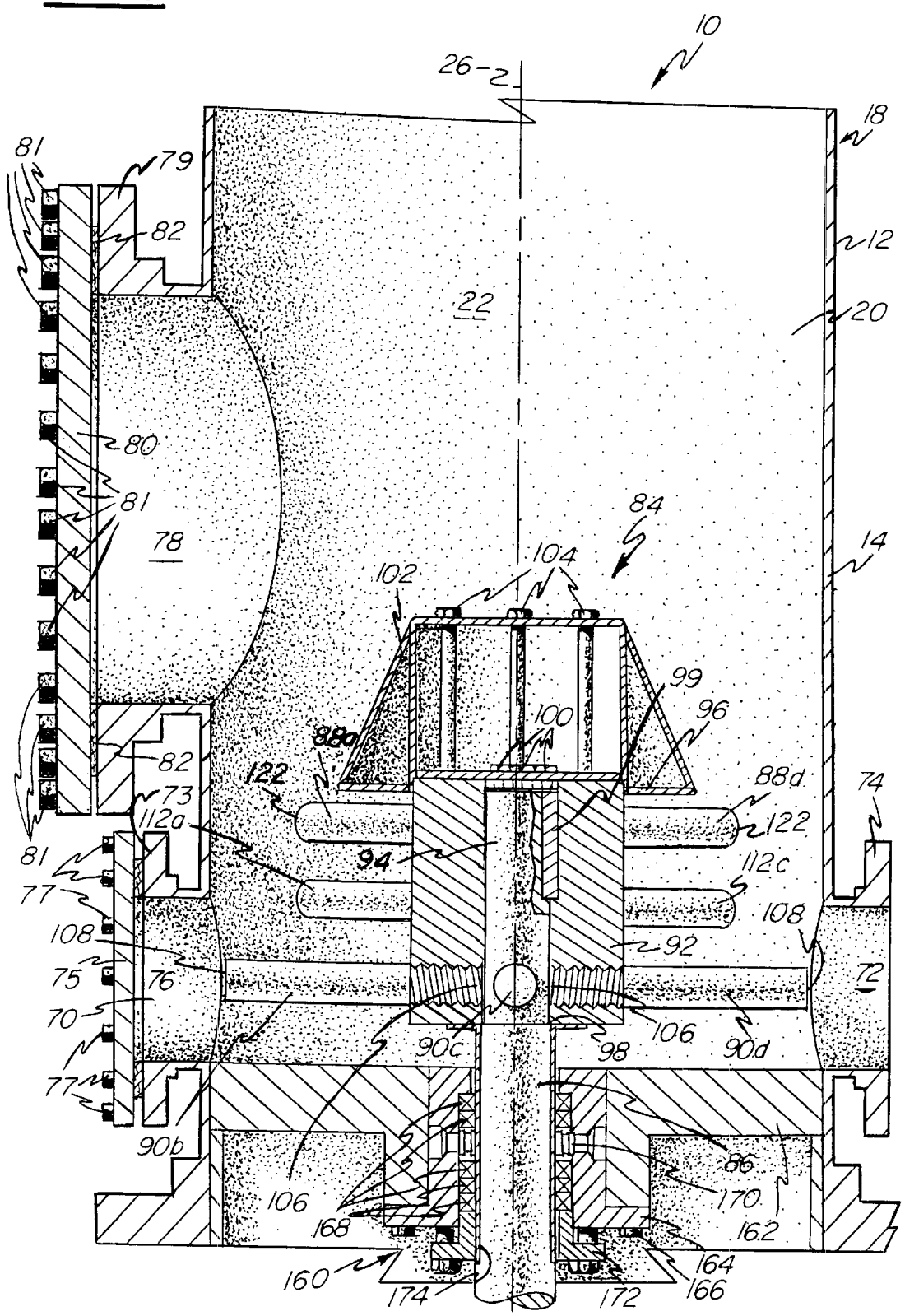
FIG. 3 is a cross-sectional view of the lower end of the cyclone of FIG. 1.

Turning now to FIGS. 1 and 3, first and second entrained solid outlets 70 and 72 extend radially outwardly through the side wall 14 proximate the lower end 18 of the housing 12. The outlets 70 and 72 provide egress for a second, or conveying, portion of the steam conveying the entrained wood fibers from the chamber 20 to a subsequent processing step. For example, the second portion of the steam and entrained wood fibers may be sent to a conventional dryer (not shown) of the type well-known in the art. Each outlet 70 and 72 includes a mounting flange 73 and 74 for securing an outlet pipe (not shown) in a conventional manner. It should be noted that based upon the flow rate of the material processed, only one or both of the outlets 70 and 72 may be utilized. If only one outlet 72 is required, then the other outlet 70 may be sealed by a conventional cover 75 and gasket 76 fixed in place by bolts 77.

An access port 78 is provided within the side wall 14 to provide access to the interior chamber 20 of the housing 12 for cleaning and maintenance. The access port 78 includes an annular mounting flange 79 to which a cover 80 is fixed, preferably through bolts 81. A gasket 82 is preferably disposed intermediate the flange 79 and the cover 80 to prevent leakage therebetween.

Referring now to FIGS. 3 and 5–7, an agitator assembly 84 is provided proximate the lower end 18 of the housing 12 and disposed within the chamber 20 defined by the side wall 14. A vertically extending, rotatably supported drive shaft 86 is coaxially disposed with the longitudinal axis 26. First and second sets of agitator members 88 and 90 are supported for rotation with the drive shaft 86. Moreover, a cylindrical hub 92 is supported by an upper end 94 of the drive shaft 86 intermediate a plate 96 and a shoulder 98 formed on the drive shaft 86 (FIG. 3). A traditional key 99 may be utilized to prevent relative rotation between the drive shaft 86 and the hub 92. The plate 96 is secured to the shaft 86 through a plurality of bolts 100. An upstanding frusto-conical body member 102 is secured to the plate 96 through a plurality of bolts 104 and is provided for better distributing pulp entering the housing 12. Moreover, the frusto-conical body member 102 is provided for desirably maintaining the standing vortex in the cyclone 10, as well as maintaining the vortex centrally of the cyclone 10.

Each agitator member 88 and 90 is essentially identical and includes opposing first and second ends 106 and 108. Each agitator member 88 and 90 is preferably formed of a stainless steel rod for durability and resistance to corrosion. The first end 106 of each agitator member 88 and 90 is threadably received within the hub 92. Each agitator member 88 and 90 extends radially outwardly from adjacent the drive shaft 86 to the second end 108 in proximity with the inner surface 20 of the side wall 14. The agitator members 88 and 90 may be secured in place by conventional means, such as welding.

The first and second sets of agitator members 88 and 90 are axially offset, in the direction of the longitudinal axis 26, along the outer surface of the hub 92. Furthermore, each agitator member 88 and 90 is preferably circumferentially offset from every other agitator member 88 and 90. In the preferred embodiment, the first set of agitator members 88 comprises four agitator members 88a, 88b, 88c and 88d, which are equally circumferentially spaced from each other by approximately 90°. Likewise, the second set of agitator members 90 comprises four agitator members 90a, 90b, 90c and 90d, which are equally circumferentially spaced from each other by approximately 90°, and circumferentially offset from the first set of agitator members 88a, 88b, 88c and 88d by approximately 45°.

First and second sets of anti-rotation members 110 and 112 are removably supported by the side wall 14 and extend radially inwardly toward the drive shaft 86. Each of the anti-rotation members 110 and 112 preferably comprise a stainless steel rod having first and second ends 114 and 116. The first set of anti-rotation members 110 preferably comprise first, second and third anti-rotation members 110a, 110b and 110c, wherein the first anti-rotation member 110a is circumferentially spaced from the second anti-rotation member 110b by approximately 135°. The second anti-rotation member 110b is circumferentially spaced from the third anti-rotation member 110c by approximately 90°, wherein the third anti-rotation member 110c is circumferentially spaced from the first anti-rotation member 110a by approximately 135°.

The second set of anti-rotation members 112 is axially offset, in the direction of the longitudinal axis 26, from the first set of anti-rotation members 110 and includes first, second and third anti-rotation members 112a, 112b and 112c. The first anti-rotation member 112a is circumferentially spaced from the second anti-rotation member 112b by approximately 135°. The second anti-rotation member 112b is circumferentially spaced from the third anti-rotation member 112c by approximately 135°, wherein the third anti-rotation member 112c is offset from the first anti-rotation 112a by approximately 90°. It should be further noted that the anti-rotation members of the first set 110 are circumferentially offset by approximately 180° from the anti-rotation members of the second set 112. As such, it may be appreciated that each anti-rotation member 110 and 112 is circumferentially offset from every other anti-rotation member 112 and 110.

The first and second sets of anti-rotation members 110 and 112 are axially spaced, in the direction of the longitudinal axis 26, relative to both the first and second sets of agitator members 88 and 90. Moreover, the anti-rotation members 110 and 112 and agitator members 88 and 90 are spaced axially in alternating succession. As such, the agitator members 88 and 90 and the anti-rotation members 110 and 112 cooperate to facilitate agitation of the solid material within the lower end 18 of the housing 12. The meshing interaction between the anti-rotation members 110 and 112 and the agitator members 88 and 90 prevents the solid material from congealing and forming a solid plug blocking the first and second entrained solid outlets 70 and 72.

Figure 5:
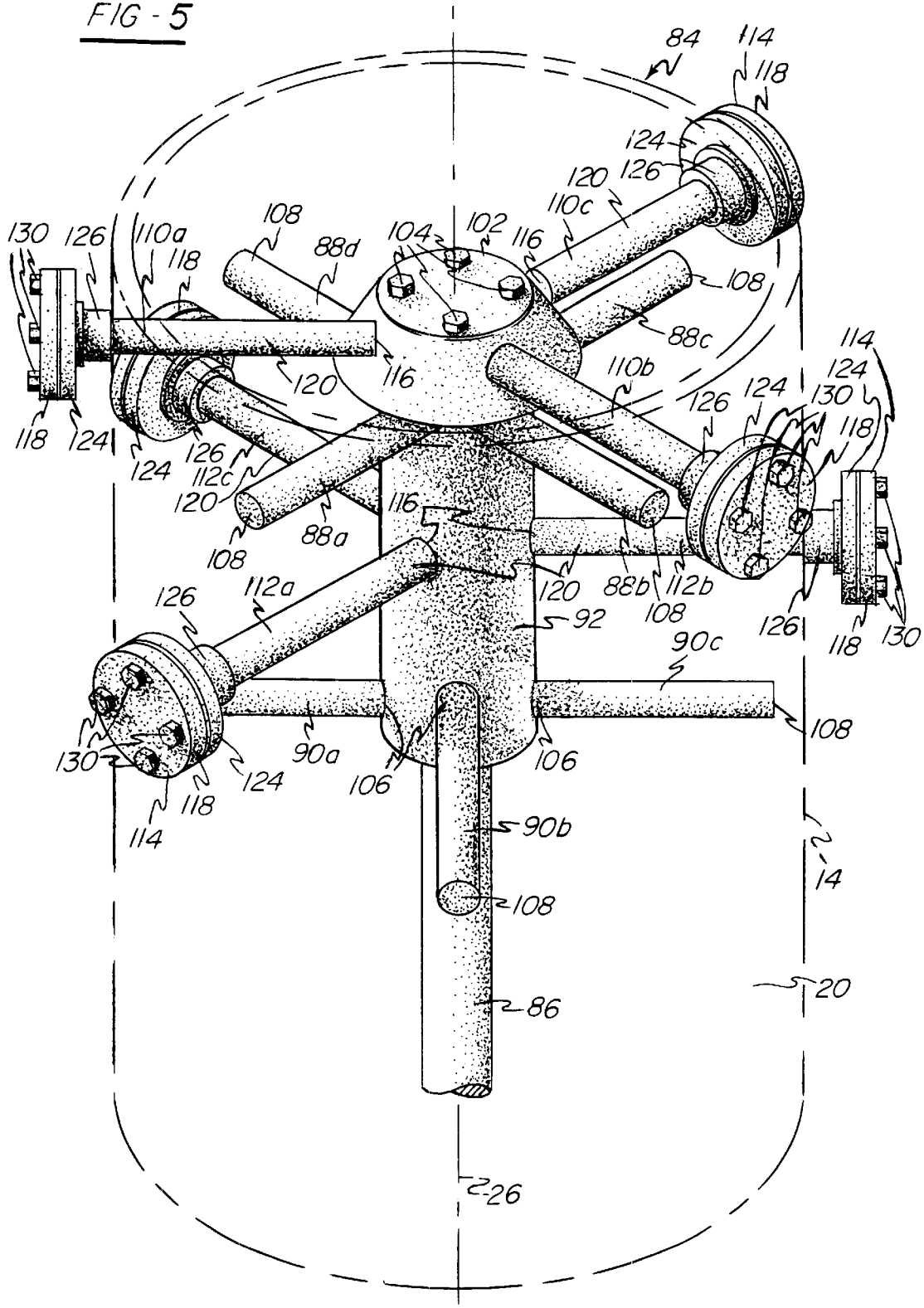
FIG. 5 is a perspective view of the agitator assembly of the present invention, with the housing illustrated in phantom for clarity.
Figure 6:
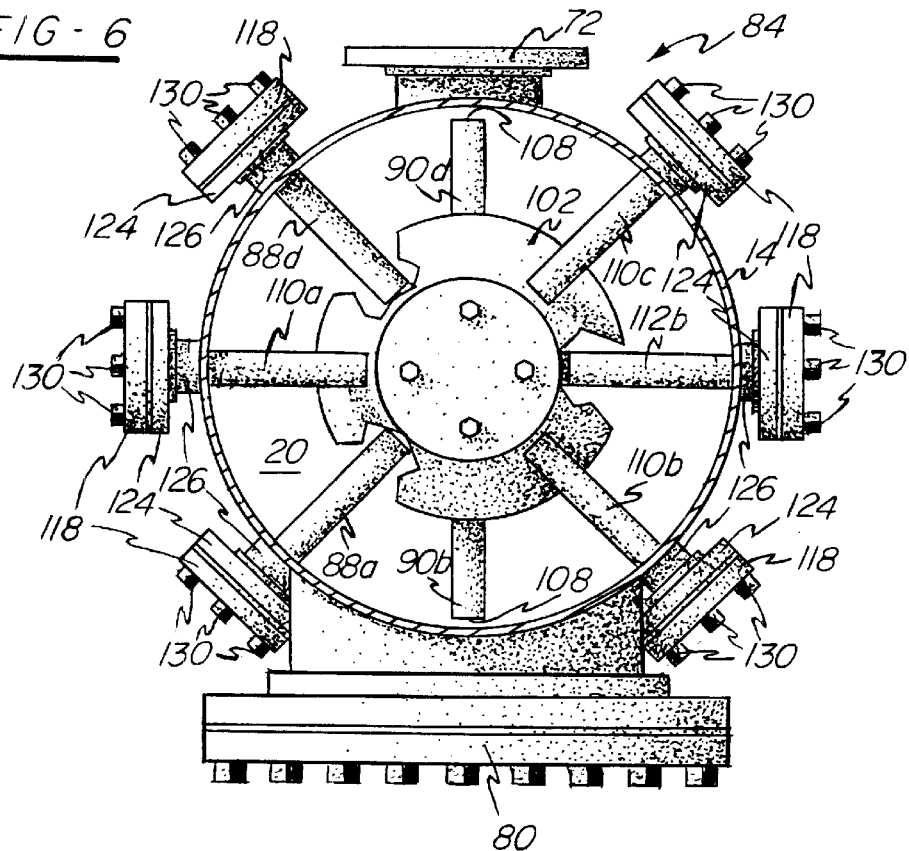
FIG. 6 is a top plan view of the agitator assembly of FIG. 5, taken along line 6—6 of FIG. 1.
Figure 7:
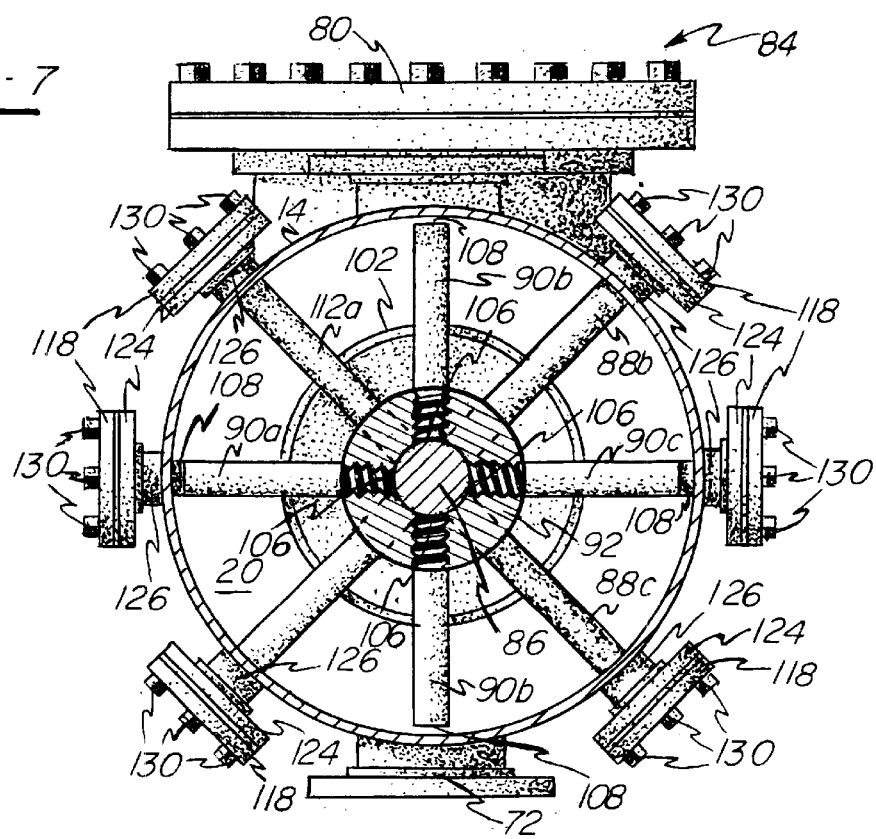
FIG. 7 is a bottom plan view of the agitator assembly of FIG. 5, taken along line 7—7 of FIG. 1.
Figure 8:
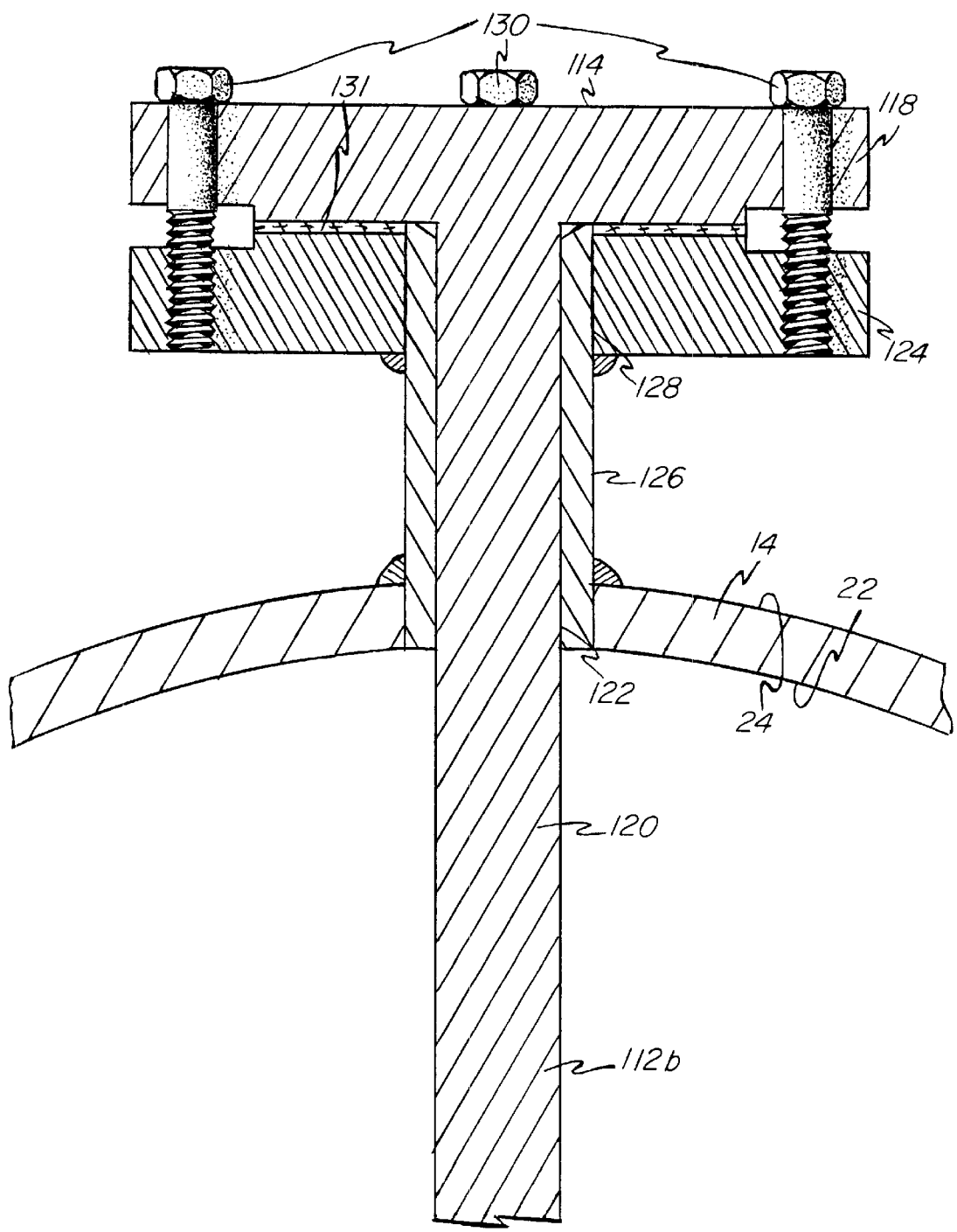
FIG. 8 is a cross-sectional view taken along line 8—8 of FIG. 1.

Referring further to FIGS. 5 and 8, a blind mounting flange 118 is fixed to the first end 114 of each anti-rotation member 110 and 112. Each anti-rotation member 110 and 112 includes a body portion 120 extending between the flange 118 and the second end 116. The body portion 120 of each anti-rotation member 110 and 112 is received within one of a plurality of mounting apertures 122 formed within the side wall 14 of the housing 12. A plurality of annular flanges 124 are secured to the outer surface 24 of the side wall 14 by a spacer 126. A receiving aperture 128 is concentrically formed within each of the annular flanges 124. Each receiving aperture 128 is coaxially aligned with one of the plurality of mounting apertures 122 (FIG. 8).

The mounting flange 118 of each anti-rotation member 110 and 112 is secured to the annular flange 124 by a plurality of bolts 130, wherein the body portion 120 extends through the receiving aperture 128 and mounting aperture 122. The body portion 120 extends radially inwardly to terminate at the second end 116 proximate the hub 92. A gasket 131 is preferably positioned between the annular flange 124 and the mounting flange 118 to seal against leakage therebetween.

Figure 9:
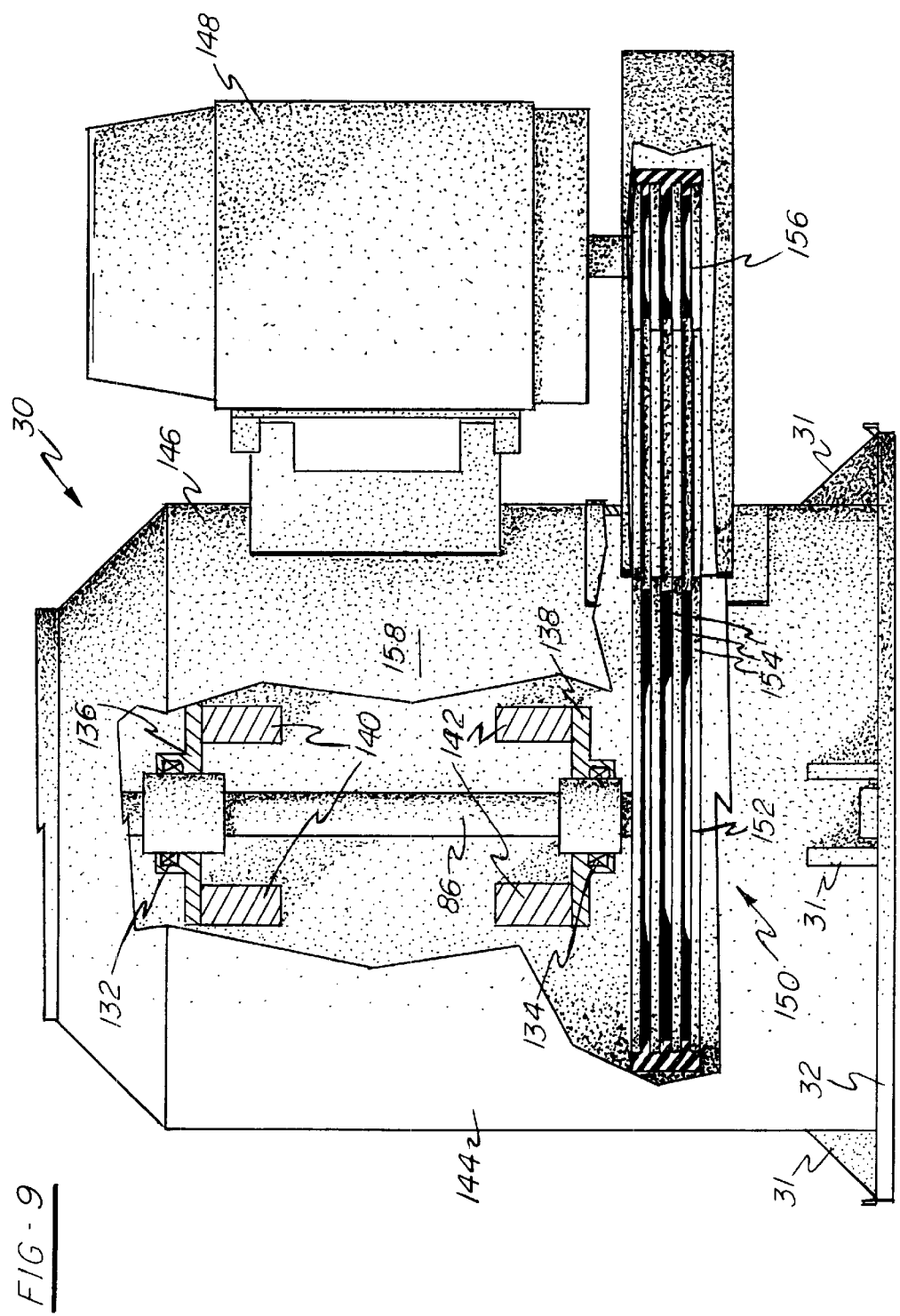
FIG. 9 is a perspective view, with a partial cut-away, of the drive assembly of the present invention.

Referring further to FIGS. 3 and 9, the drive assembly 30 includes an upper bearing 132 and a lower bearing 134 supporting the drive shaft 86. The bearings 132 and 134 are each supported within brackets 136 and 138 which, in turn, are fixed to support members 140 and 142 connected to a cylindrical side wall 144 forming a drive housing 146. A drive motor 148 is operably connected to the lower end 150 of the drive shaft 86. In the preferred embodiment, a shaft driving sheave 152 is connected by belts 154 to a shaft sheave 156 of the drive motor 148, which is mounted on the outside surface 158 of the cylindrical drive housing 146. The drive motor 148 and sheaves 152 and 156 are selected to preferably permit rotation of the drive shaft 86 at a speed of approximately 270 rpm. In the preferred embodiment, the motor 148 comprises a 40 horsepower, totally enclosed fan cooled (TEFC) motor of the type readily available on the market.

Referring further to FIGS. 1 and 3, a pressure seal 160 is preferably provided around the drive shaft 86 proximate the lower end plate 162 of the housing 12. The lower end plate 162 is sealingly received within the side wall 14 of the housing 12. The pressure seal 160 may be of conventional design and is used to seal against egress of solid material or pressurized fluid from the housing 12 along the shaft 86. In the preferred embodiment, the seal 160 includes a stuffing box 164 mounted to the end plate 162 through bolts 166. A plurality of packing rings 168 and a lantern ring 170 are contained within the stuffing box 164 by a packing gland 172. The lantern ring 170 is of conventional design and may be supplied with a cooling fluid, such as water. A flanged sleeve 174 is preferably disposed between the drive shaft 86 and the pressure seal 160 to protect the outer surface of the shaft 86 from damaging contact with the packing rings 168.

While the pressure seal 160 is preferred, it should be appreciated that conventional seals may be readily substituted therefor.

Next, the operation of the pressurized cyclone 10 of the present invention will be described in greater detail. Initially, an admixture of entrained refined wood fibers and pressurized process steam is provided directly into the inlet 34 from the blow line of a conventional refiner. The tangential orientation of the inlet 34 results in a swirling motion of the admixture wherein the entrained wood fibers are centrifugally urged toward the inner surface 20 of the side wall 14 of the housing 12. The first portion of the steam, which is removed from the admixture, then exhausts upwardly through the gaseous fluid outlet 54 for further processing, preferably by a fluidized bed boiler which sufficiently oxidizes volatile compounds therein by combustion.

The remaining second portion of the steam and entrained wood fibers proceed downwardly to proximate the lower end of the housing 12 into proximity to the agitator assembly 84. Moreover, the drive shaft 86, as driven by the motor 148, causes rotational movement of the agitator members 88 and 90 about the longitudinal axis 26. The axially offset anti-rotation members 110 and 112 cooperate with the agitator members 88 and 90 to promote the agitation of the solid material, and prevents the plugging of the entrain solid outlets 70 and 72. The remaining second portion of the steam in the housing 12 blows the wood fibers through the entrained solid outlets 70 and 72, preferably to a conventional dryer. The cyclone 10 of the present invention is essentially placed intermediate the refiner and dryer of a conventional fiberboard processing system and therefore additional details of the system are not considered necessary for a thorough understanding of the cyclone 10.

It may be appreciated that by the removal of a significant portion of the steam from the admixture received within the pressurized cyclone, volatile compounds contained therein may be further processed to remove the total amount of volatile organic compound emissions from the overall process.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A cyclone for receiving a fluid flow in which solid material is entrained in a gaseous fluid maintained at an elevated pressure, said cyclone comprising:

a housing including an upper end, a lower end, and a side wall including an arcuate inner surface and an outer surface, said side wall defining a longitudinal axis;

an inlet formed within said housing and positioned proximate said upper end for inducing the fluid flow to rotate about said longitudinal axis to impart centrifugal force on the solid material;

a gaseous fluid outlet extending upwardly from said upper end of said housing for providing egress of a first portion of the gaseous fluid;

an entrained solid outlet formed within said housing and positioned proximate said lower end for providing egress of the solid material entrained within a second portion of the gaseous fluid;

an agitator assembly positioned within said housing proximate said lower end, said agitator assembly including a plurality of radially extending agitator members supported for rotation about said longitudinal axis, a plurality of radially extending anti-rotation members fixed relative to said side wall, said plurality of anti-rotation members positioned in axially spaced relation relative to said plurality of agitator members; and a motor operably connected to said plurality of agitator members for rotating said agitator members about said longitudinal axis whereby said agitator members move relative to said anti-rotation members for agitating the solid material.

2. The cyclone of claim 1 wherein said inlet is oriented in substantially tangential relation to said side wall.

3. The cyclone of claim 1 further comprising a wear liner positioned adjacent said inner surface of said side wall proximate said upper end of said housing.

4. The cyclone of claim 1 further comprising:

a vertically extending, rotatably supported drive shaft coaxially disposed with said longitudinal axis; and wherein said plurality of agitator members are supported for rotation with said drive shaft and extend radially outwardly toward said side wall, and said plurality of anti-rotation members are fixed from rotating by said side wall and extend radially inwardly toward said drive shaft.

5. The cyclone of claim 4 further comprising:

a hub supported for rotation with said drive shaft; and wherein each of said agitator members includes opposing first and second ends, said first end threadably received within said hub.

6. The cyclone of claim 4 wherein each of said anti-rotation members includes opposing first and second ends, said first end removably supported by said side wall.

7. The cyclone of claim 6 further comprising:

a mounting flange fixed to said first end of each said anti-rotation member;

a plurality of mounting apertures formed within said side wall;

a plurality of annular flanges supported by said outer surface of said side wall, each of said annular flanges including a receiving aperture coaxially aligned with one of said mounting apertures; and wherein said mounting flange is releasably secured to said annular flange, and each said anti-rotation member extends radially inwardly through one of said receiving apertures and one of said mounting apertures.

8. The cyclone of claim 4 wherein said drive shaft includes opposing first and second ends, said motor operably connected to said first end, and a frusto-conical member supported on said second end.

9. The cyclone of claim 4 wherein said plurality of agitator members comprise first and second sets of agitator members, said first set of agitator members axially spaced relative to said second set of agitator members.

10. The cyclone of claim 9 wherein each of said plurality of agitator members is circumferentially offset from every other one of said agitator members and extends from proximate said drive shaft to proximate said side wall.

11. The cyclone of claim 9 wherein said second set of agitator members are axially aligned with said entrained solid outlet.

12. The cyclone of claim 9 wherein said plurality of anti-rotation members comprise first and second sets of anti-rotation members, said first set of anti-rotation members axially spaced relative to said second set of anti-rotation members, and said first and second sets of anti-rotation members axially spaced relative to both said first and second sets of agitator members.

13. The cyclone of claim 12 wherein each of said plurality of anti-rotation members is circumferentially offset from every other one of said anti-rotation members and extends from proximate said side wall to proximate said drive shaft.

14. A cyclone for receiving a fluid flow in which solid material is entrained in a gaseous fluid maintained at an elevated pressure, said cyclone comprising:

a housing including an upper end, a lower end, and a substantially cylindrical side wall defining a longitudinal axis and having an arcuate inner surface and an outer surface, said housing having a plurality of mounting apertures extending through said side wall;

a vertically extending, rotatably supported drive shaft coaxially disposed with said longitudinal axis;

an inlet formed within said housing and oriented in substantially tangential relation to said side wall for inducing the fluid flow to rotate about said longitudinal axis to impart centrifugal force on the solid material;

a gaseous fluid outlet extending upwardly from said upper end of said housing for providing egress of a first portion of the gaseous fluid;

an entrained solid outlet formed within said housing and positioned proximate said lower end for providing egress of the solid material entrained within a second portion of the gaseous fluid;

first and second sets of agitator members supported for rotation with said drive shaft about said longitudinal axis, each of said plurality of agitator members including opposing first and second ends and extending radially outwardly toward said side wall, said first set of agitator members axially spaced relative to said second set of agitator members;

first and second sets of anti-rotation members removably supported by said side wall, each of said plurality of anti-rotation members extending radially inwardly toward said drive shaft through said plurality of mounting apertures of said side wall, said first set of anti-rotation members axially spaced relative to said second set of anti-rotation members, and said first and second sets of anti-rotation members axially spaced relative to both said first and second sets of agitator members; and a motor operably connected to said drive shaft for rotating said plurality of agitator members about said longitudinal axis whereby said agitator members move relative to said anti-rotation members for agitating the solid material.

* * * * *